(12) United States Patent
Tanaka et al.

(10) Patent No.: US 6,373,626 B1
(45) Date of Patent: Apr. 16, 2002

(54) BRIGHT AND DARK FIELD SWITCHING DEVICE AND MICROSCOPE

(75) Inventors: Shoichi Tanaka; Hidekazu Sano; Hitoshi Isobe, all of Kanagawa (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/708,626

(22) Filed: Nov. 9, 2000

(30) Foreign Application Priority Data

Nov. 25, 1999 (JP) ............................................ 11-334109

(51) Int. Cl.⁷ .......................... G02B 21/06; G02B 21/00
(52) U.S. Cl. ...................... 359/390; 359/368; 359/388; 359/381
(58) Field of Search ................................. 359/368–390

(56) References Cited

U.S. PATENT DOCUMENTS

| | | | | |
|---|---|---|---|---|
| 4,407,569 A | * | 10/1983 | Piller et al. ................ | 359/387 |
| 4,487,486 A | | 12/1984 | Hayasaka ................... | 359/385 |
| 4,687,304 A | * | 8/1987 | Piller et al. ................ | 359/387 |
| 4,753,525 A | * | 6/1988 | Gaul et al. ................. | 359/368 |
| 6,222,671 B1 | * | 4/2001 | Ogihara ..................... | 359/390 |
| 6,226,118 B1 | * | 5/2001 | Koyama et al. ........... | 359/380 |

* cited by examiner

Primary Examiner—Thong Nguyen
(74) Attorney, Agent, or Firm—Oliff & Berridge, PLC

(57) ABSTRACT

A bright and dark field switching device, according to the present invention, comprises a glare-proof filter 31 and a condenser lens 32 for a dark field, a guide mechanism 40, and a switching mechanism 60. The glare-proof filter 31 and the condenser lens 32 for a dark field are arranged on both sides with an optical path L of an illuminating optical system interposed therebetween. The guide mechanism 40 holds the glare-proof filter 31 and the condenser lens 32 for a dark field such that they can be moved to the optical path L and can be returned from the optical path L. The switching mechanism 60 moves the glare-proof filter 31 and the condenser lens 32 for a dark field to the optical path L and returns them from the optical path L. Further, the switching mechanism 60 moves the glare-proof filter 31 together so as to position the same on the optical path L only when returning the condenser lens 32 for a dark field from the optical path L.

7 Claims, 9 Drawing Sheets

BRIGHT AND DARK FIELD SWITCHING DEVICE AND MICROSCOPE

BACKGROUND OF THE INVENTION

1. Field of the Invention

The present invention relates to a bright and dark field switching device and a microscope. More particularly, the invention relates to a bright and dark field switching device which is provided on an optical path of an illuminating optical system and can switch bright field illumination and dark field illumination, and a microscope which can switch bright field illumination and dark field illumination.

2. Description of the Related Art

In order to carry out observation through a microscope, bright field illumination is used for checking a comparatively rough portion of an object upon a workpiece, and dark field illumination is required for checking a comparatively fine portion of the object upon a workpiece, for example, a circuit pattern of an IC to determine the presence of a flaw.

Therefore, there has been known a microscope comprising a bright and dark field switching device capable of switching the bright field illumination and the dark field illumination.

The related art bright and dark field switching device has switched the bright field illumination and the dark field illumination by using a slide unit 100 shown in FIG. 9.

The slide unit 100 includes a rectangular body portion 101 and an operation knob 102. The body portion 101 has three kinds of filters, specifically, a filter 103 for bright field observation (which will hereinafter be referred to "bright field filter"), a glare-proof filter 104 and a filter 105 for dark field observation (which will hereinafter be referred to "dark field filter") which are provided rectilinearly.

In use, the slide unit 100 is inserted in the illuminating optical path of the microscope and the amount of push-in (or pull-out) of the slide unit 100 is changed so as to selectively position, on the illuminating optical path, either of the bright field filter 103 and the dark field filter 105 which are provided on the slide unit 100. Thus, the observation is carried out. In this case, when switching from the dark field filter 105 to the bright field filter 103 is to be carried out, the countermeasures are taken such that dazzling is not caused even if the dark field observation is switched into the bright field observation. More specifically, the glare-proof filter 104 is provided in the middle between the bright filed filter 103 and the dark field filter 105.

With the above-mentioned related art structure, however, the amount of movement of the slide unit 100 is increased with the switching. When the amount of pull-out is the greatest, the filter 105 close to the operation knob 102 gets out of the microscope body. Consequently, a refuse or dust sticks to a filter surface.

If the slide unit 100 is to be pulled out most greatly such that the filter 105 does not get out of the microscope body, the size of the microscope body should be increased. For this reason, a cost is increased and operability is lacking.

For such a problem, it is also proposed that a unit having a bright field filter and a dark field filter and a unit having a glare-proof filter should be provided separately from each other and should be operated independently, respectively.

With such a structure, however, the two units should be operated in separate positions from each other. Therefore, an alternate holding operation is required so that the operability is more deteriorated.

SUMMARY OF THE INVENTION

In order to solve the problems, it is an object of the invention to provide a bright and dark field switching device and a microscope which can carry out switching into three states of the bright field illumination, the dark field illumination and the glare-proof illumination with a reduction in a size and high operability.

In order to achieve the object, the bright and dark field switching device and a microscope according to the invention employ the following structure.

A bright and dark field switching device for a microscope provided on an optical path of an illuminating optical system, according to the present invention, comprises:

a glare-proof optical part for limiting the amount of light illuminated form the illuminating optical system;

an optical part for dark field observation;

a guide mechanism for holding the glare-proof optical part and the optical part for dark field observation such that they can be moved to the optical path and can be returned from the optical path; and a switching mechanism for moving the glare-proof optical part and the optical part for dark field observation to the optical path and returning them from the optical path, and for moving the glare-proof optical part together and positioning the glare-proof optical part on the optical path only when returning the optical part for dark field observation from the optical path, wherein the glare-proof optical part and the optical part for dark field observation are provided on both sides with the optical path of the illuminating optical system interposed therebetween.

The optical part for dark field observation indicates a condenser lens for a dark field (will hereinafter be referred to "condenser lens"), a filter for a dark field or a metallic shielding mask.

According to such a structure, the glare-proof optical part and the optical part for dark field observation are provided through the guide mechanism on both sides with the optical path of the illuminating optical system interposed therebetween such that they can be moved to the optical path and can be returned from the optical path. The movement and return are carried out by the switching mechanism. Therefore, a smaller amount of movement is enough as compared with the structure of a slide unit having three kinds of related art filters provided rectilinearly. Therefore, even if the size of the device itself is not increased, the filter does not get out of the body. Accordingly, a reduction in the size of the device can be maintained.

Moreover, the switching mechanism can move the glare-proof optical part and the optical part for dark field observation to the optical path and can return them from the optical path. Also the switching mechanism can move the glare-proof optical part together and can position the same on the optical path only when returning the optical part for dark field observation from the optical path. Therefore, also when the switching is to be carried out from the dark field observation to the bright field observation, the glare-proof optical part is once positioned on the optical path. Consequently, an observer is not dazzled. Accordingly, the observer does not need to keep his (or her) eyes off from an eyepiece when carrying out the switching from the dark field observation to the bright field observation. Therefore, it is possible to carry out the switching from the bright field illumination to the dark field illumination without damaging operability.

In the above-mentioned the bright and dark field switching device, it is preferable that the guide mechanism includes:

a first slider having the glare-proof optical part and disposed on a microscope body of the microscope movably in a direction parallel with movement and return of the glare-proof optical part and the optical part for dark field observation;

a second slider having the optical part for dark field observation and disposed on the microscope body of the microscope movably in the direction parallel with movement and return of the glare-proof optical part and the optical part for dark field observation; and a positioning mechanism for positioning the first and second sliders in a position where the glare-proof optical part and the optical part for dark field observation are moved onto the optical path and a position where they are returned from the optical path.

According to such a structure, the glare-proof optical part and the optical part for dark field observation are held in the first and second sliders provided movably in the direction parallel with the directions of the movement and return of the optical parts. Therefore, the moving and returning operations can be carried out smoothly. In addition, there is provided the positioning mechanism for positioning the sliders in the position where the glare-proof optical part and the optical part for dark field observation are moved onto the optical path and the position where they are returned from the optical path. Therefore, it is possible to accurately position the glare-proof optical part and the optical part for dark field observation on the optical path.

Further, in the bright and dark field switching device, it is preferable that the switching mechanism includes:

a sleeve disposed on the microscope body slidably in the direction in parallel with the direction of the movement and return of the glare-proof optical part and the optical part for dark field observation and having a first operation portion on an outer end thereof;

a shaft provided slidably in the sleeve and having a second operation portion on an outer end thereof;

a first coupling member for coupling the sleeve to the first slider; and a second coupling member for coupling the shaft to the second slider, wherein when one of the first operation portion and the second operation portion is slid in one direction, the other of the first operation portion and the second operation portion is engaged and slid with the one of the first operation portion and the second operation portion, and the first operation portion is disengaged from the second operation portion when the first operation portion is slid in the other direction.

According to such a structure, for instance, if the first operation portion (sleeve) is slid in one direction (for example, a pull-out direction) in a state in which the optical part for dark field observation is positioned on the optical path, the second operation portion (shaft) is also slid together in one direction because the second operation portion is engaged with the first operation portion. Consequently, the optical part for dark field observation is returned from the optical path and the glare-proof optical part is positioned on the optical path.

Subsequently, when the first operation portion (sleeve) is slid in the other direction (for example, a push-in direction), the first operation portion is disengaged from the second operation portion. Therefore, the second operation portion (shaft) is not slid but only the first operation portion (sleeve) is slid in the other direction. Consequently, the glare-proof optical part is returned from the optical path. Therefore, the state in which any optical part is not positioned on the optical path is obtained, that is, switching into bright field observation is carried out.

Then, when the second operation portion (shaft) is slid in the other direction, the optical part for dark field observation is positioned on the optical path, that is, switching into dark field observation is carried out.

Accordingly, when the first and second operation portions positioned coaxially are simply slid, the switching can be carried out from the bright field observation to the dark field observation. Also in that case, the glare-proof optical part is once positioned on the optical path before the bright field observation is changed from the dark field observation. Therefore, the switching operation can be carried out without dazzling the observer.

In the bright and dark field switching device, it is preferable that the first operation portion includes a concave portion on an outer end face thereof, and the second operation portion includes a flange portion having such a size as to be almost accommodated in the concave portion, wherein the flange portion of the second operation portion is accommodated in the concave portion of the first operation portion and the second operation portion is engaged and slid with the first operation portion when the first operation portion is slid in one direction.

According to such a structure, the concave portion is provided on the outer end face of the first operation portion and the flange portion is provided on the second operation portion. Therefore, the engagement and disengagement of the first and second operation portions can be implemented with a very simple and inexpensive structure.

The above-mentioned the bright and dark field switching device may further comprises:

an optical part for bright field observation disposed on the second slider to be positioned on the optical path when the optical part for dark field observation is returned from the optical path.

The optical part for bright field observation indicates a condenser lens for a bright field and a filter for a bright field.

With such a structure, the optical part for bright field observation is attached to the second slider. By positioning the second slider on the optical path, therefore, the bright field observation can be carried out through the optical part for bright field observation.

A microscope for observing an object to be measured, according to the present invention, comprises:

a body for mounting the object to be measured thereon;

an illuminating optical system for illuminating the light to the object to be measured mounted on the body;

an observing optical system for observing the light transmitted form the object to be measured;

a glare-proof optical part for limiting the amount of light illuminated form the illuminating optical system;

an optical part for dark field observation;

a guide mechanism for holding the glare-proof optical part and the optical part for dark field observation such that they can be moved to the optical path and can be returned from the optical path; and a switching mechanism for moving the glare-proof optical part and the optical part for dark field observation to the optical path and returning them from the optical path, and for moving the glare-proof optical part together and positioning the glare-proof optical part on the optical path only when returning the optical part for dark field observation from the optical path, wherein the glare-proof optical part and the optical part for dark field observation are provided on both sides with the optical path of the illuminating optical system interposed therebetween.

DETAILED DESCRIPTION OF THE PREFERRED EMBODIMENT

An embodiment of the invention will be described below with reference to the drawings.

Figure 1:
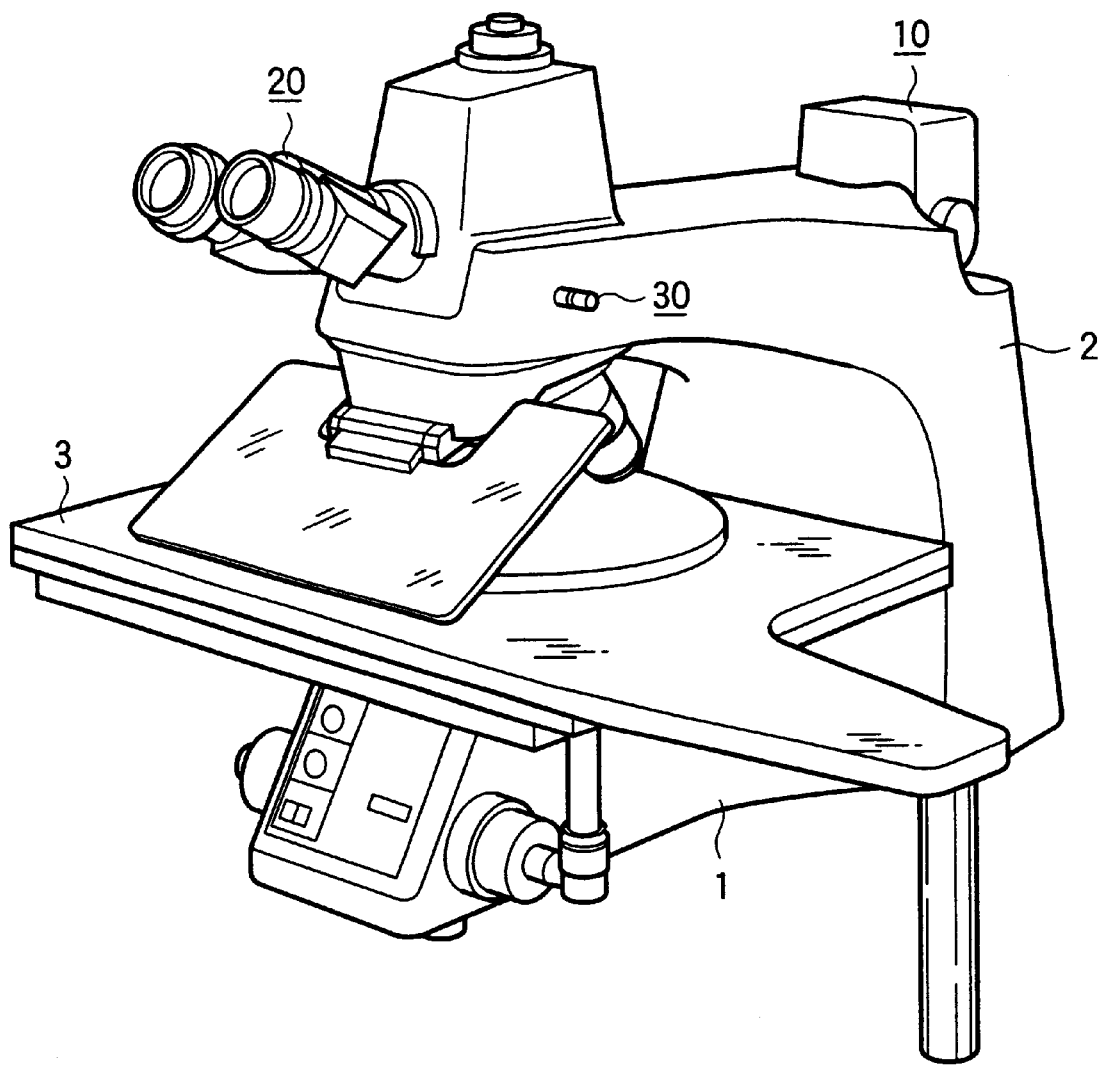
FIG. 1 is a perspective view showing an embodiment of a microscope to which a bright and dark field switching device according to the invention is applied.

FIG. 1 is a perspective view showing a microscope comprising a bright and dark field switching device according to the embodiment. The microscope comprises a base portion 1 and a column portion 2 extended upward from the rear part of the base portion 1.

A stage 3 for mounting an object to be measured is provided on the base portion 1 movably in transverse, longitudinal and vertical directions. The column portion 2 is provided with an illuminating optical system 10, an observing optical system 20 and a bright and dark field switching device 30. The illuminating optical system 10 is used for providing an illuminating light on the object to be measured. The observing optical system 20 is used for observing the light transmitted from the object to be measured.

Figure 2:
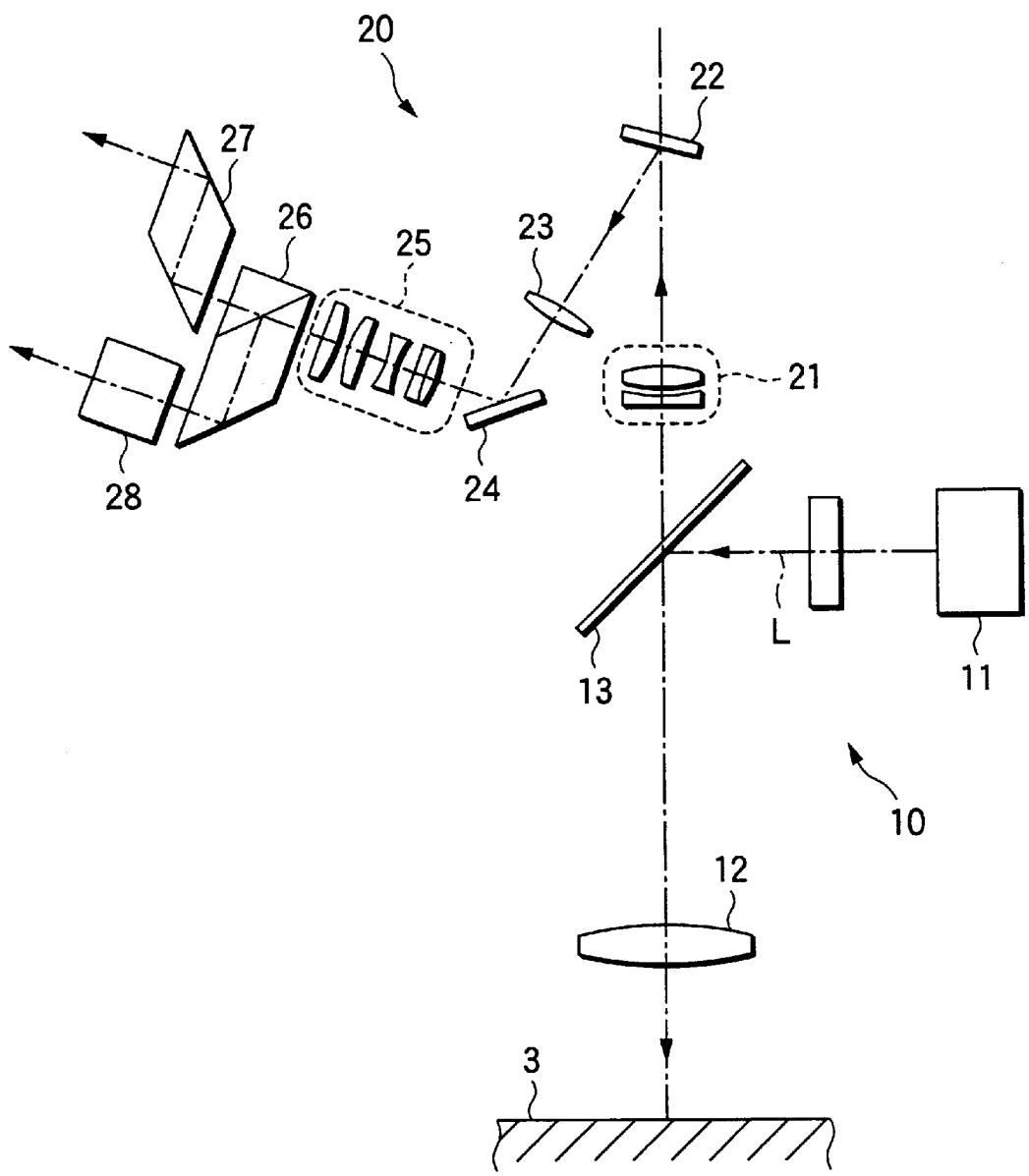
FIG. 2 is a view showing the arrangement of an optical part according the embodiment of the invention.

As shown in FIG. 2, the illuminating optical system 10 is provided with a light source device 11, an objective lens 12 to be attached to a revolver (see FIG. 1), and a beam splitter 13. The beam splitter 13 reflects a light transmitted from the light source device 11 and irradiates, through the objective lens 12, the reflected light on the object to be measured and transmits the reflected light from the object to be measured.

As shown in FIG. 2, the observing optical system 20 includes a tube lens 21, an optical path switching mirror 22, a field lens 23, a relay mirror 24, a relay lens 25, a prism 26, and observing optical parts 27 and 28. The tube lens 21 and the optical path switching mirror 22 are provided on the optical axes of the beam splitter 13 and the objective lens 12. The field lens 23 and there lay mirror 24 are provided on a reflecting optical path of the optical path switching mirror 22. The relay lens 25 and the prism 26 are provided on a reflecting optical path of the relay mirror 24. The observing optical parts 27 and 28 are used for observing each light separated by the prism 26.

Figure 3:
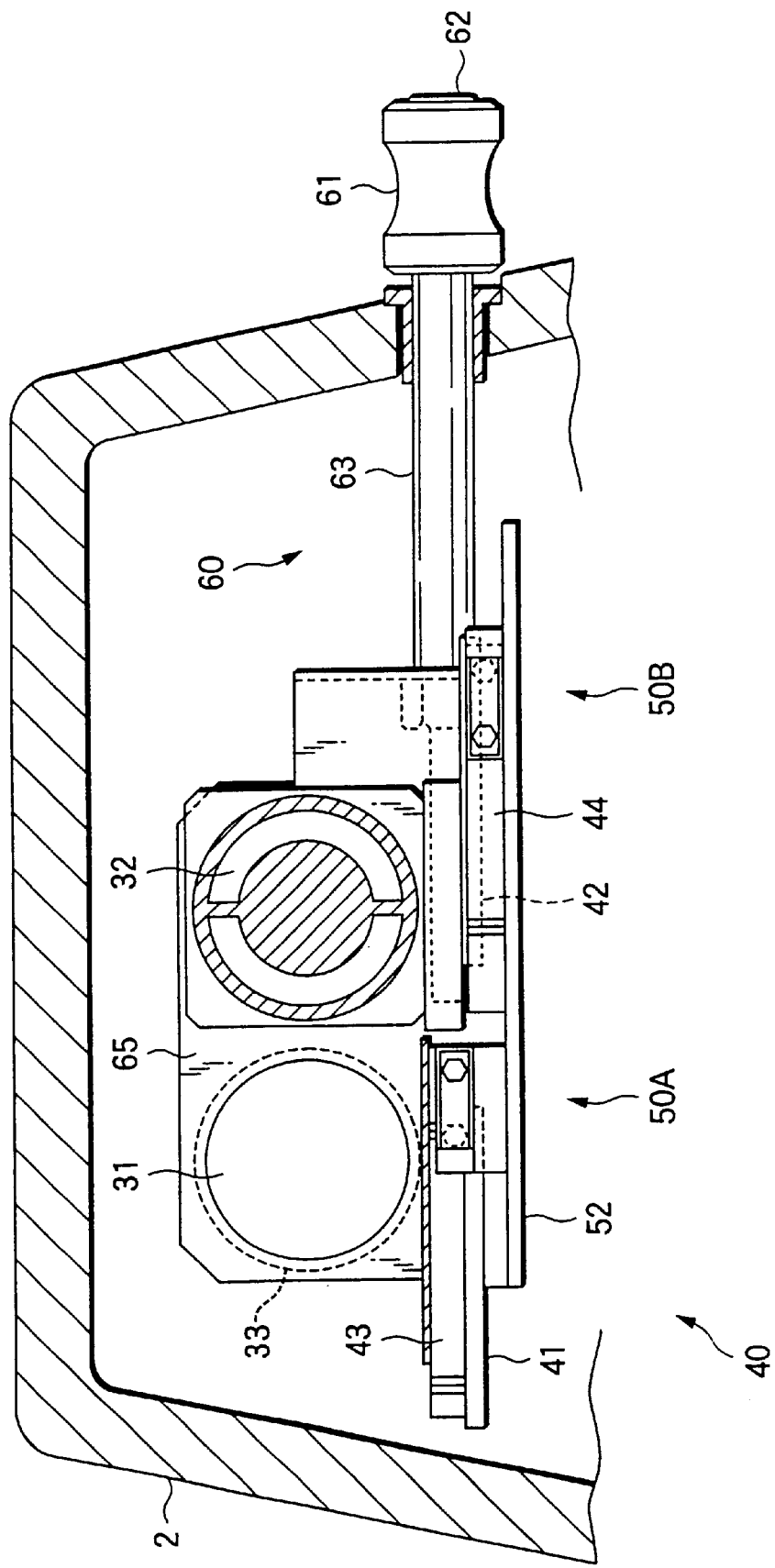
FIG. 3 is front view showing a bright and dark field switching device (dark field observation state) according to the embodiment of the invention.
Figure 4:
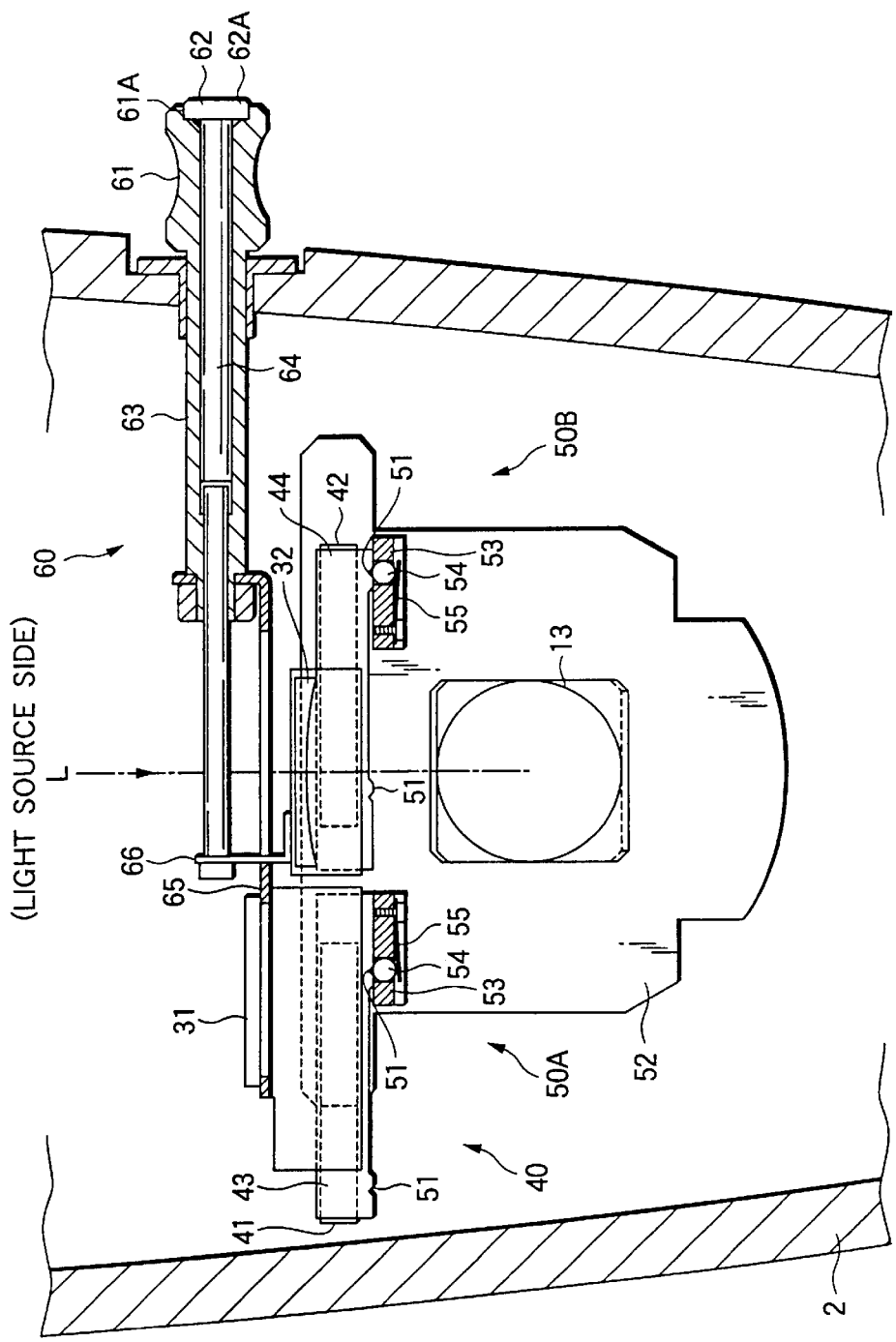
FIG. 4 is a plan view showing the bright and dark field switching device (dark field observation state) according to the embodiment of the invention.

As shown in FIGS. 3 and 4, the bright and dark field switching device 30 includes a glare-proof filter 31 to be a glare-proof optical part, a condenser lens 32 for a dark field to be an optical part for dark field observation, a guide mechanism 40 and a switching mechanism 60. The glare-proof filter 31 and the condenser lens 32 are provided on both sides with an optical path L of the illuminating optical system 10 (an optical path from the light source device 11 to the beam splitter 13) interposed therebetween. The guide mechanism 40 holds the glare-proof filter 31 and the condenser lens 32 such that they can be moved to the optical path L and can be returned from the optical path L. The switching mechanism 60 moves the glare-proof filter 31 and the condenser lens 32 to the optical path L and returns them from the optical path L. Also, the switching mechanism 60 moves the glare-proof filter 31 together and positions the same on the optical path L only when returning the condenser lens 32 from the optical path L.

The guide mechanism 40 includes guide members 41 and 42, first and second sliders 43 and 44 and positioning mechanisms 50A and 50B. The guide members 41 and 42 are provided in the column portion 2 acting as a microscope body in parallel with the directions of movement and return of the glare-proof filter 31 and the condenser lens 32. The first and second sliders 43 and 44 are movably provided along the guide members 41 and 42. The glare-proof filter 31 and the condenser lens 32 are disposed on the guide members 41 and 42. The positioning mechanisms 50A and 50B positions the sliders 43 and 44 in a position where the glare-proof filter 31 and the condenser lens 32 are moved onto the optical path L and a position where they are returned from the optical path L.

The positioning mechanisms 50A and 50B are provided with a pair of V grooves 51, a holding block 53, a roller 54, and a leaf spring 55. The pair of V grooves 51 is provided on the sliders 43 and 44 at intervals in the direction of the movement thereof. The holding block 53 is provided on a side of the column portion 2 through a mounting plate 52. The roller 54 is held in the holding block 53 and engaged with or disengaged from the V groove 51. The leaf spring 54 urges the roller 54 toward the sliders 43 and 44.

The switching mechanism 60 includes a sleeve 63, a shaft 64, a first coupling member 65, and a second coupling member 66. The sleeve 63 is slidably provided in the column portion 2 in an axial direction in parallel with the directions of the movement and return of the glare-proof filter 31 and the condenser lens 32 and has a first operation knob 61 on an outer end thereof. The shaft 64 is slidably provided in the sleeve 63 and has a second operation knob 62 on an outer end thereof. The first coupling member 65 is used for coupling the sleeve 63 to the first slider 43. The second coupling member 66 is used for coupling the shaft 64 to the second slider 44.

In this embodiment, the second operation knob 62 can be accommodated in the first operation knob 61. The second operation knob 62 is engaged and slid with the first operation knob 61 when the first operation knob 61 is slid in one direction (pull-out direction). The second operation knob 62 is disengaged from the first operation knob 61 when the first operation knob 61 is slid in the other direction (push-in direction). More specifically, a disk-shaped concave portion 61A is formed on the outer end face of the first operation knob 61, and the second operation knob 62 includes a disk-shaped flange portion 62A having such a size as to be almost accommodated in the concave portion 61A.

Next, the function of the embodiment will be described.

Figure 5:
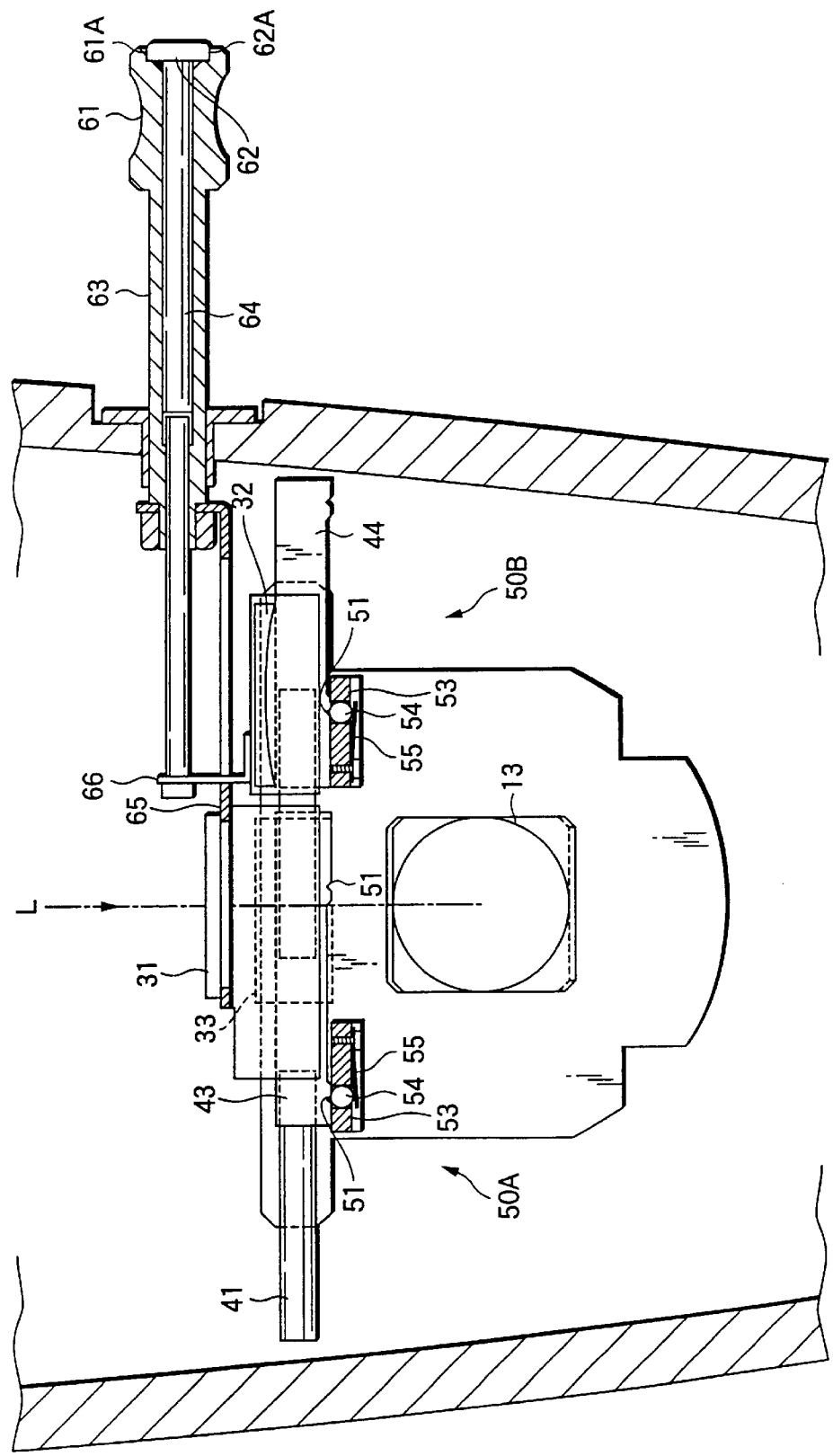
FIG. 5 is a plan view showing a state in which a glare-proof filter is positioned on an optical path in the embodiment of the invention

If the first operation knob 61 is slid in one direction (pull-out direction) in a state in which the condenser lens 32 is positioned on the optical path L, that is, a state shown in FIGS. 3 and 4, the second operation knob 62 (shaft 64) is also slid together in one direction because the flange portion 62A of the second operation knob 62 is engaged with the concave portion 61A of the first operation knob 61. As shown in FIG. 5, consequently, the condenser lens 32 is returned from the optical path L and the glare-proof filter 31 is positioned on the optical path L.

Figure 6:
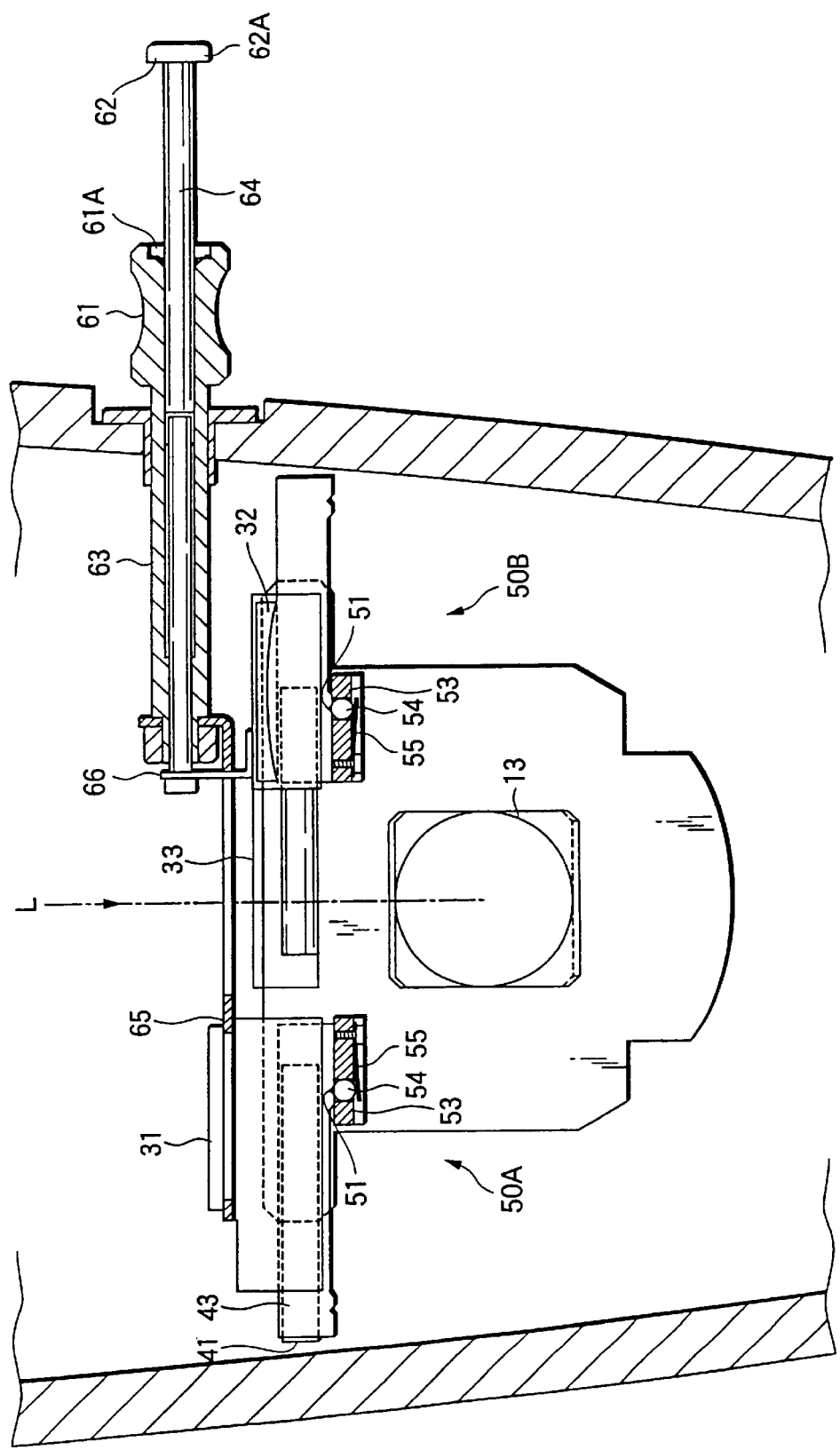
FIG. 6 is a plan view showing the bright and dark field switching device (bright field observation state) according to the embodiment of the invention.

Subsequently, when the first operation knob 61 is slid in the other direction (push-in direction), the first operation knob 61 is disengaged from the second operation knob 62. Therefore, the second operation knob 62 (shaft 64) is not slid but only the first operation knob 61 (sleeve 63) is slid in the other direction. As shown in FIG. 6, consequently, the glare-proof filter 31 is returned from the optical path L. Therefore, the state in which any optical part is not positioned on the optical path L is obtained, that is, switching into bright field observation is carried out.

Then, when-the second operation knob 62 (shaft 64) is slid in the other direction (push-in direction), the condenser lens 32 is positioned on the optical path L, that is, switching into dark field observation is carried out. Consequently, the original state shown in FIGS. 3 and 4 is recovered.

Thus, the switching is carried out to bring the state in which the condenser lens 32, the glare-proof filter 31 and any lens and filter are not provided on the optical path L. Consequently, the switching from the dark field observation to the bright field observation or the switching reverse thereto can be carried out.

According to the bright and dark field switching device in accordance with the embodiment, therefore, the glare-proof filter 31 and the condenser lens 32 are provided through the guide mechanism 40 on both sides with the optical path L of the illuminating optical system 10 interposed therebetween such that they can be moved to the optical path L and can be returned from the optical path L. The movement and return are carried out by the switching mechanism 60. Therefore, a smaller amount of movement is enough as compared with the structure of a slide unit having three kinds of the related art filters provided rectilinearly. Therefore, even if the size of the device itself is not increased, the filter (or the lens) does not get out of the microscope body. Accordingly, a reduction in the size of the device can be maintained.

Moreover, the switching mechanism 60 moves the glare-proof filter 31 and the condenser lens 32 to the optical path L and returns them from the optical path L. Also, the switching mechanism 60 moves the glare-proof filter 31 together and positions the same on the optical path L only when the condenser lens 32 for a dark field is returned from the optical path L. Therefore, also when the switching is carried out from the dark field observation to the bright field observation, the glare-proof filter 31 is once positioned on the optical path L before the bright field observation is changed from the dark field observation. Consequently, an observer is not dazzled. Accordingly, the observer does not need to keep his (or her) eyes off from an eye piece when carrying out the switching operation from the dark field observation to the bright field observation. Therefore, it is possible to carry out the switching from the bright field illumination to the dark field illumination without damaging operability.

More specifically, the switching mechanism 60 includes the sleeve 63 provided slidably in an axial direction in parallel with the directions of the movement and return of the glare-proof filter 31 and the condenser lens 32 and having the first operation knob 61, the shaft 64 slidably provided, in the sleeve 63 and having the second operation knob 62, the first coupling member 65 for coupling the sleeve 63 to the first slider 43, and the second coupling member 66 for coupling the shaft 64 to the second slider 44. The second operation knob 62 can be accommodated in the first operation knob 61, and is engaged and slid with the second operation knob 62 when the first operation knob 61 is slid in one direction and is disengaged from the first operation knob 61 when the first operation knob 61 is slid in the other direction. Therefore, if the first operation knob 61 and the second operation knob 62 which are positioned coaxially are simply slid, the switching can be carried out from the bright field observation to the dark field observation. Also in that case, since the glare-proof filter 31 is once positioned on the optical path L before the bright field observation is changed from the dark field observation, the switching operation can be carried out without dazzling the observer.

In particular, since the concave portion 61A is provided on the outer end face of the first operation knob 61 and the flange portion 62A is provided on the second operation knob 62, the engagement and disengagement of the first and second operation knobs 61 and 62 can be implemented with a very simple and inexpensive structure. With such a structure, moreover, the flange portion 62A of the second operation knob 62 enters the concave portion 61A of the first operation knob 61 and cannot be pulled out therefrom in the state of the dark field observation, that is, the state in which the first operation knob 61 and the second operation knob 62 are pushed in together. Therefore, there is no fear that the switching from the dark field observation to the bright field observation might be inadvertently carried out without the glare-proof filter 31 provided therebetween.

Furthermore, the glare-proof filter 31 and the condenser lens 32 are held in the first and second sliders 43 and 44 provided movably in the direction parallel with the directions of the movement and return of the optical parts 31 and 32 through the guide members 41 and 42. Therefore, the moving and returning operations can be carried out smoothly.

In addition, there are provided the positioning mechanisms 50A and 50B for positioning the sliders 43 and 44 in the position where the glare-proof filter 31 and the condenser lens 32 are moved onto the optical path L and the position where they are returned from the optical path L. Therefore, it is possible to accurately position the glare-proof filter 31 and the condenser lens 32 on the optical path L.

The glare-proof filter 31 is attached to the first slider 43 and the condenser lens 32 is attached to the second slider 44 in the embodiment, which is not restricted. For example, the second slider 44 may be provided with an optical part 33 for bright field observation (such as a condenser lens for a bright field or a filter for a bright field) which is positioned on the optical path L when the condenser lens 32 is returned from the optical path L.

Thus, the optical part 33 for bright field observation is positioned on the optical path L through the second slider 44, resulting in the bright field observation through the optical part 33 for the bright field observation.

Figure 7:
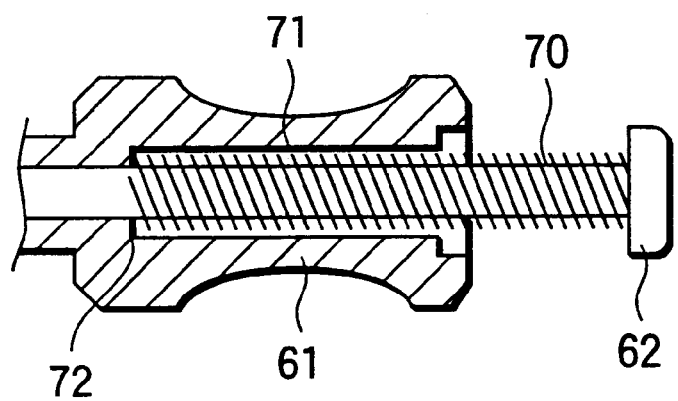
FIG. 7 is a plan view showing a spring provided between the shaft and the first coupling member.

In the embodiment, moreover, the concave portion 61A is provided on the outer end face of the first operation knob 61 and the flange portion 62A of the second operation knob 62 enters the concave portion 61A so that the second operation knob 62 cannot be pulled out of the first operation knob 61, which is not restricted. For example, if a spring 70 is provided between the first operation knob 61 and the second operation knob 62 as shown in FIG. 7, the same effects can be obtained. More particularly, the first operation knob 61 has an accommodation portion 71 for accommodating the spring 70. The spring 70 is attached to a base portion 72 of the accommodation portion 71 at one end thereof and attached to the second operation knob 62 at the other end thereof. Therefore, the first operation knob 61 is also slid following the second operation knob 62 through the spring when the second operation knob 62 is pulled out of the first operation knob 61. Further, a spring 80 may be provided between the shaft 64 (or the second coupling member 66) and the first coupling member 65 as shown in FIG. 8 and the same effects can be also obtained.

Figure 8:
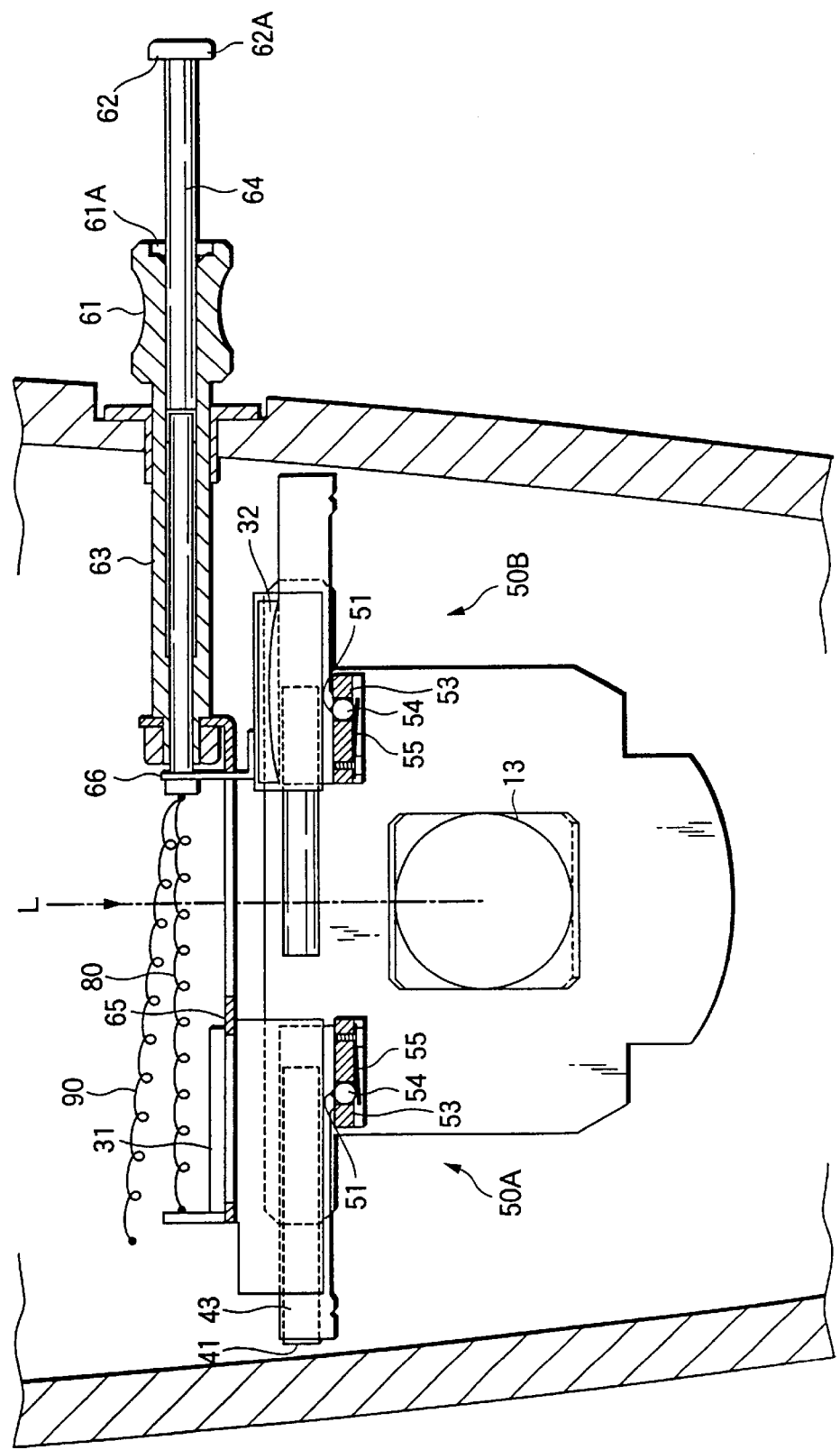
FIG. 8 is a plan view showing a bright and dark field switching device according to other embodiment of the invention.
Figure 9:
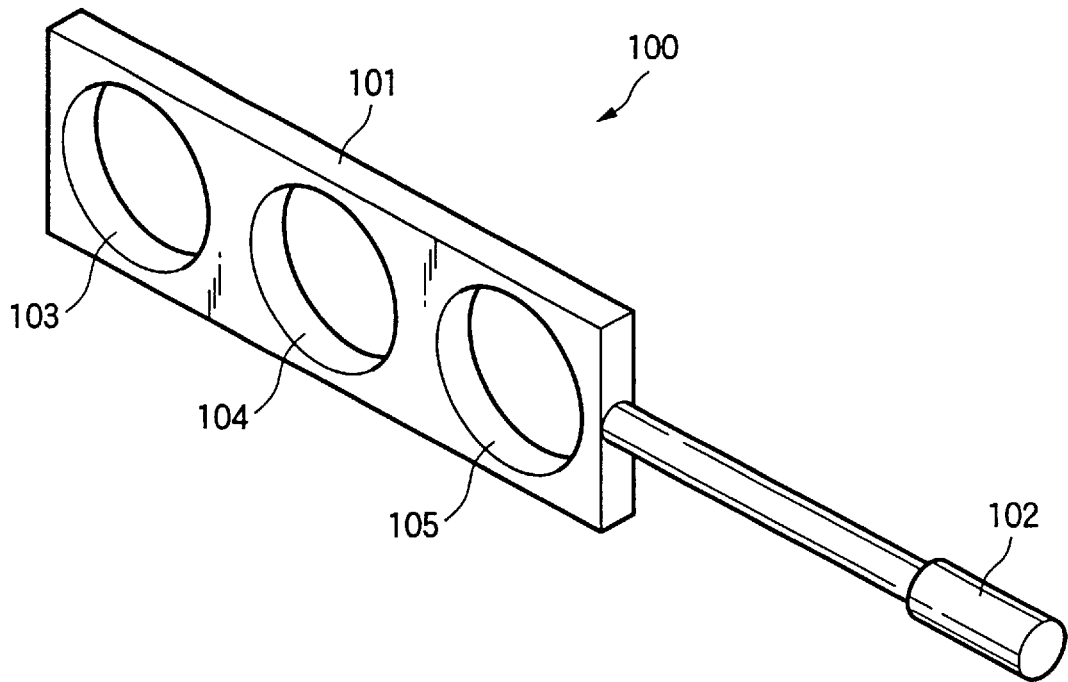
FIG. 9 is a perspective view showing a related art bright and dark field switching unit.

Furthermore, a spring 90 may be provided between the shaft 64 (or the second coupling member 66) and fixation portion, for example the column portion 2, and urged in such a direction that the shaft 64 is always pushed into the body as shown in FIG. 8. In this case, when the second operation knob 62 is pushed, the switching into the dark field observation is carried out only by slightly touching the second operation knob 62 with fingers in the state as shown in the state of FIG. 6.

In the embodiment, moreover, if the glare-proof filter 31 and the condenser lens 32, the guide mechanism 40 for holding the glare-proof filter 31 and the condenser lens 32 such that they can be moved to the optical path L and can be returned from the optical path L, and the switching mechanism 60 for moving the glare-proof filter 31 and the condenser lens 32 to the optical path L and returning them from the optical path L and for moving the glare-proof filter 31 together and positioning the same on the optical path L only when returning the condenser lens 32 from the optical path L are integrally constituted into a unit, an existing microscope can also be attached later.

According to the bright and dark field switching device for a microscope in accordance with the invention, it is possible to maintain a reduction in a size and to carry out switching into three kinds of states, that is, bright field illumination, dark field illumination and glare-proof illumination without damaging operability.

What is claimed is:

1. A bright and dark field switching device for a microscope provided on an optical path of an illuminating optical system, comprising:

a glare-proof optical part for limiting the amount of light illuminated form the illuminating optical system;

an optical part for dark field observation wherein the glare-proof optical part and the optical part for dark field observation are provided on both sides with the optical path of the illuminating optical system interposed therebetween;

a guide mechanism for holding the glare-proof optical part and the optical part for dark field observation such that they can be moved to the optical path and can be returned from the optical path; and a switching mechanism for moving the glare-proof optical part and the optical part for dark field observation to the optical path and returning them from the optical path, and for moving the glare-proof optical part together and positioning the glare-proof optical part on the optical path only when returning the optical part for dark field observation from the optical path, wherein said switching mechanism includes:

a sleeve disposed on the microscope body slidably in the direction in parallel with the direction of the movement and return of the glare-proof optical part and the optical part for dark field observation and having a first operation portion on an outer end thereof;

a shaft provided slidably in the sleeve and having a second operation portion on an outer end thereof;

a first coupling member for coupling the sleeve to a first slider, the first slider having the glare-proof optical part and disposed on a microscope body of the microscope movably in a direction parallel with movement and return of the glare-proof optical part and the optical part for dark field observation; and a second coupling member for coupling the shaft to a second slider, the second slider having the optical part for dark field observation and disposed on the microscope body of the microscope movably in the direction parallel with movement and return of the glare-proof optical part and the optical part for dark field observation, wherein with one of the first operation portion and the second operation portion is slid in one direction, the other of the first operation portion and the second operation portion is engaged and slid with the one of the first operation portion and the second operation portion, and the first operation portion is disengaged from the second operation portion when the first operation portion is slid in the other direction.

2. The bright and dark field switching device according to claim 1, wherein the first operation portion includes a concave portion on an outer end face thereof, and the second operation portion includes a flange portion having such a size as to be almost accommodated in the concave portion, wherein the flange portion of the second operation portion is accommodated in the concave portion of the first operation portion and the second operation portion is engaged and slid with the first operation portion when the first operation portion is slid in one direction.

3. The bright and dark field switching device according to claim 1, further comprising:

an optical part for bright field observation disposed on the second slider to be positioned on the optical path when the optical part for dark field observation is returned from the optical path.

4. The bright and dark field switching device according to claim 1, wherein the switching mechanism includes:

a spring attached to the first operation portion at one end thereof and attached to the second operation portion at the other end thereof, wherein the first operation portion slides with the second operation portion when the second operation portion is slid in one direction.

5. The bright and dark field switching device according to claim 1, wherein the switching mechanism includes:

a spring attached to the shaft and urged to the direction of the return of the glare-proof optical part.

6. The bright and dark field switching device according to claim 1, wherein the positioning mechanism includes:

at least two first V-shaped grooves provided on the first slider with a predetermined interval in a direction of the movement of the first slider;

first holding block disposed on the microscope body and being adjacent to the first slider;

a first roller held by the first holding block so that it can be engaged with or disengaged from the first V-shaped grooves;

a first leaf spring urged the first roller to the first slider;

at least two second V-shaped grooves provided on the second slider with a predetermined interval in a direction of the movement of the second slider;

a second holding block disposed on the microscope body and being adjacent to the second slider;

a second roller held by the second holding block so that it can be engaged with or disengaged from the second V-shaped grooves; and a second leaf spring urged the second roller to the second slider.

7. A microscope for observing an object to be measured, said microscope comprising:

a body for mounting the object to be measured thereon;

an illuminating optical system for illuminating the light to the object to be measured mounted on the body;

an observing optical system for observing the light transmitted from the object to be measured;

a glare-proof optical part for limiting the amount of light illuminated from the illuminating optical system;

an optical part for dark field observation wherein the glare-proof optical part and the optical part for dark field observation are provided on both sides with the optical path of the illuminating optical system interposed therebetween;

a guide mechanism for holding the glare-proof optical part and the optical part for dark field observation such that they can be moved to the optical path and can be returned from the optical path; and a switching mechanism for moving the glare-proof optical part and the optical part for dark field observation to the optical path and returning them from the optical path, and for moving the glare-proof optical part together and positioning the glare-proof optical part on the optical path only when returning the optical part for dark field observation from the optical path, wherein said switching mechanism includes:

a sleeve disposed on the microscope body slidably in the direction in parallel with the direction of the movement and return of the glare-proof optical part and the optical part for dark field observation and having a first operation portion on an outer end thereof;

a shaft provided slidably in the sleeve and having a second operation portion on an outer end thereof;, a first coupling member for coupling the sleeve to a first slider, the first slider having the glare-proof optical part and disposed on a microscope body of the microscope movably in a direction parallel with movement and return of the glare-proof optical part and the optical part for dark field observation; and a second coupling member for coupling the shaft to a second slider, the second slider having the optical part for dark field observation and disposed on the microscope body of the microscope movably in the direction parallel with movement and return of the glare-proof optical part and the optical part for dark field observation, wherein when one of the first operation portion and the second operation portion is slid in one direction, the other of the first operation portion and the second operation portion is engaged and slid with the one of the first operation portion and the second operation portion, and the first operation portion is disengaged from the second operation portion when the first operation portion is slid in the other direction.

* * * * *